United States Patent [19]

Otani et al.

[11] Patent Number: 4,869,823
[45] Date of Patent: Sep. 26, 1989

[54] ROTARY DRUM TYPE SOLID-LIQUID SEPARATION APPARATUS

[75] Inventors: Mitsunobu Otani; Tamotsu Date; Takashi Nagayama; Tsuneo Kouzuki, all of Shiga, Japan

[73] Assignee: Toray Industries, Inc., Tokyo, Japan

[21] Appl. No.: 239,206

[22] Filed: Aug. 30, 1988

[51] Int. Cl.$^4$ .............................................. B01D 33/16
[52] U.S. Cl. .................................... 210/349; 210/394; 210/403; 210/505
[58] Field of Search ............... 210/121, 349, 393, 394, 210/402, 403, 497.01, 505, 784

[56] References Cited

U.S. PATENT DOCUMENTS

| | | | |
|---|---|---|---|
| 1,833,315 | 11/1931 | Burhans | 210/393 |
| 1,870,442 | 8/1932 | Coley | 210/403 |
| 3,979,289 | 9/1976 | Bykowski et al. | 210/403 |
| 4,038,187 | 7/1977 | Saffran | 210/402 |
| 4,198,299 | 4/1980 | Ewing et al. | 210/403 |
| 4,707,260 | 11/1987 | Nagayama et al. | 210/402 |

FOREIGN PATENT DOCUMENTS

| | | | |
|---|---|---|---|
| 526519 | 4/1954 | Belgium | 210/394 |
| 1404009 | 7/1964 | France | 210/402 |
| 49-80664 | 8/1974 | Japan . | |
| 207917 | 12/1983 | Japan . | |
| 115720 | 7/1984 | Japan . | |
| 61-35886 | 8/1986 | Japan . | |

Primary Examiner—Richard V. Fisher
Assistant Examiner—Linda S. Evans
Attorney, Agent, or Firm—Birch, Stewart, Kolasch & Birch

[57] ABSTRACT

A solid-liquid separation apparatus wherein a solid-liquid mixture is introduced into a rotary filtration drum having filter cloth mounted thereon and is allowed to pass through the filter cloth to thereby separate the solids contained therein. The filter cloth has one surface facing the interior of the drum and covered with a napped filter layer which is formed by a multiplicity of fibers having a diameter of 0.1 to 10 $\mu$m. The filter cloth preferably has an elongation percentage of not smaller than 1.0%. A base material of the filter cloth includes a weft extending along the rotational axis of the drum and a warp extending in the circumferential direction of the drum. The fibers of the napped filter layer are formed by napping chiefly the weft in the direction of the warp. A first sprayer is arranged in a facing relation to the outer peripheral surface of the filter cloth, for flushing a collecting liquid to collect the solids arrested by the filter cloth, and a collecting hopper is arranged inside the drum, for collecting the solids washed off by the collecting liquid. A second sprayer is arranged in a facing relation to the inner peripheral surface of the filter cloth, for flushing a washing liquid to wash off the solids attached to the fibers of the napped filter layer. Further, a third sprayer is arranged outside the drum for washing the filter cloth with chemicals, and a baffle plate is arranged inside the filtration drum.

13 Claims, 10 Drawing Sheets

PRIOR ART

PRIOR ART

ROTARY DRUM TYPE SOLID-LIQUID SEPARATION APPARATUS

BACKGROUND OF THE INVENTION

The present invention relates to an apparatus for performing solid-liquid separation by use of a filtration drum having a rotary drum and filter cloth mounted thereon.

U.S. Pat. No. 4,038,187, Japanese Patent Laid Open No. 49-80664, and Japanese Patent Laid Open No. 61-35886, for example, disclose a so-called rotary drum type solid-liquid separation apparatus wherein a solid-liquid mixture is introduced into a filtration drum having a drum body, and a filter medium, e.g., a stainless steel wire net or flocked filter cloth, mounted around the drum body, and the liquid is allowed to pass through the filter medium while the filtration drum is rotated, thereby separating the solid content from the solid-liquid mixture. Apparatuses of this type are used in a variety of industrial fields.

The stainless steel wire net used as the filter medium of the conventional solid-liquid separation apparatus is required to have a sufficient strength, and therefore, reduction in the wire diameter is restricted. If a wire net with small meshes is used, the treating ability of the apparatus is reduced due to the small open area ratio of the net. In order to enhance the treating ability using a wire net with small meshes, the rotational speed of the filtration drum or the level differential between the liquid inside and outside the drum needs to be increased.

However, if the rotational speed of the filtration drum is increased, the number of times the elements constituting the drum, particularly the reinforcing ribs, plunge into and emerge from the liquid increases correspondingly, with the result that the surface of the liquid inside the drum is caused to rise and fall violently. The solids caught by the filter medium will therefore be partly washed off before they reach a collecting position located at an upper portion of the drum. Thus, the amount of the solids that can finally be collected is still small, and the treating ability of the apparatus is not enhanced so much. On the other hand, in the case in which the level differential between the liquid inside and outside the drum is increased, it is necessary to use larger-sized or a greater number of reinforcing ribs, so as to withstand an increased mechanical load. This arrangement, however, causes the liquid surface to rise and fall even more turbulently. In the worst case, the filtration drum will vibrate due to the undulation of the liquid, preventing stable solid-liquid separation.

A wire net having small meshes may be used so as to catch small substances such as suspended substances. However, a problem arises in that the wire net becomes clogged in a short period of time. Once the net becomes clogged, the substances attached to the net cannot be removed easily even if the net is washed.

As the filter medium, flocked filter cloth is known which is formed by flocking short fibers of 30 to 100 $\mu$m in diameter on the surface of a woven material by using an adhesive thereby to form raised fibers, as disclosed in the above-mentioned Japanese patent laid open No. 61-35886. Also known as the filter medium is napped filter cloth which is formed by napping a base woven material to form raised fibers or naps having a large diameter of several tens of microns. In these conventional filter cloths, the strength required as the filter cloth is imparted by the base woven material, and the raised fibers formed on the surface of the woven material serve to catch or arrest solids. Thus, the raised fibers serve as a filter layer. The apparatus using the conventional filter cloths are, however, poor in the solid arresting rate and the treating ability.

This is because, in the case of the flocked cloth formed with raised fibers by using an adhesive, the density of the fibers must not be so high that the openings of the woven material may not be filled with the adhesive, and because the diameter of the raised fibers is as large as 30 to 100 $\mu$m and therefore the interval between the fibers cannot be made small. For these reasons, when the conventional flocked filter cloth is used, it is essentially necessary to combine several solids into a larger one by using a high-molecular coagulant etc., which leads to an increase in the running cost and causes the problem of toxicity which some coagulants have. Furthermore, the use of coagulant results in an increase in the amount of solids, and the amount of the coagulant to be added needs to be checked all the time, thus making the inspection of the operation conditions of the apparatus extremely troublesome.

The raised fibers with a large diameter are rigid and unyielding, and consequently the space between the fibers is large and deep. Further, the number of the raised fibers is so small that the surface of the woven material is visible, and, in some cases, the fibers become curled and make the filter layer bulky. Therefore, if solids enter the space between the raised fibers while being deformed, they will not easily come out of the space. As a result, the filter cloth becomes clogged and impairs the treating ability of the apparatus. Clogging of the filter cloth is particularly noticeable when the rigid fibers penetrate the solids.

Japanese Patent Laid Open No. 59-115720 and U.S. Pat. No. 4,707,260, for example, disclose filter cloth for solid-liquid separation, which comprises a belt-like base material and a filter layer formed by raising the fibers on the surface of the base material, and disclose a belt press type dewatering apparatus using the filter cloth. At least the weft extending in the width direction of the base material is formed of a polyester fiber. The raised fibers comprise fine fibers which are formed by napping chiefly the weft in one direction along the length of the base material and have a diameter of 0.1 to 10 $\mu$m.

Thus, the filter cloth employed in this belt press type dewatering apparatus has raised fine fibers which are flexible and yielding, thus providing very narrow and relatively shallow space between the raised fibers. Therefore, the filter cloth can arrest even very small solids and at the same time be prevented from becoming clogged, whereby a solid arresting rate, treating ability, etc. much superior to those obtained with the flocked filter cloth mentioned above can be achieved.

In the rotary drum type solid-liquid separation apparatus, solids contained in the solid-liquid mixture are separated from the liquid as the mixture passes through the filter cloth. The solids caught by the filter cloth are successively collected or withdrawn by collecting water flushed onto the filter cloth. Thus, in the rotary drum type solid-liquid separation apparatus, the filter cloth is alternately used for separation of solids from the liquid and withdrawal of the separated solids. The filter cloth is therefore required to have excellent capability of arresting solids and releasing them when water is flushed thereto.

Further, the rotary drum type solid-liquid separation apparatus utilizes the level differential between the liquid inside and outside the filtration drum, for causing the solid-liquid mixture to pass through the filter medium. The filtration drum and the filter medium attached to the drum body therefore receive an external force corresponding to the level differential. To withstand the external force, the filtration drum is constituted by a rotary drum structure which includes a drum body having a plurality of annular stays arranged parallel to each other and a plurality of reinforcing ribs extending horizontally inside the stays and connecting the stays together, and a filter medium mounted around the drum body. The filter medium receives not only the external force corresponding to the above-mentioned level differential but also the pressure of water flushed when the arrested solids are collected and when the filter medium is washed thereafter. If the filter medium is made of a material having high strength, such as a stainless steel wire net, no problems will be caused. In the case of cloth filter, on the other hand, consideration must be given to the strength of the cloth in view of the forces applied to the cloth.

In the rotary drum type solid-liquid separation apparatus conventionally employed, the solids arrested by the filter medium are washed off by a collecting medium flushed from the nozzles of a collecting sprayer arranged at an upper portion of and inside the filtration drum, and then are discharged from the apparatus through a collecting hopper located inside the filtration drum. After the filter medium is washed by filtered water flushed from the nozzles of a wash sprayer arranged outside the filtration drum on the downstream side of the collecting sprayer with respect to the rotational direction of the drum, it is used again for solid-liquid separation. In another type of solid-liquid separation apparatus, washing-off of the solids from the filter medium and washing of the filter medium are carried out concurrently.

The collecting medium flushed directly to the arrested solids from the nozzles of the collecting sprayer for washing off the solids, however, sometimes pushes part of the arrested solids to the outside of the filter medium, i.e., to the side of the filtered liquid. The solids leaked out to the outer surface of the filter medium degrade the quality of the filtered water.

Part of the collecting medium is repeatedly circulated. The solid content in the collecting medium will therefore be broken into small pieces, which possibly clog the filter medium or mix with the filtered water and lowers the quality of the same. Furthermore, the circulation line of the collecting medium, particularly the nozzles of the collecting sprayer, will be clogged with such solids, causing inconveniences in the operation of the apparatus.

In the case of the solid-liquid separation apparatus wherein washing-off of the solids within the filtration drum and washing of the filter medium are performed at the same time, if filter cloth having a raised fiber layer thereon is used as the filter medium, the raised fiber layer facing the interior of the filtration drum can be damaged by pressurized water flushed from the sprayer. Thus, the filter cloth is degraded in the capability of arresting the solids in the solid-liquid mixture, and the service life thereof is shortened.

Furthermore, as the solid-liquid separation apparatus is operated for a long period of time, bacteria or the like may be propagated in the filter medium and clog the same, thus degrading the filtering ability of the apparatus. In such case, the filter medium may be washed using chemicals. To ensure that the chemicals dissolve and remove the extraneous matters, the filter cloth desirably has a property of retaining the chemicals for a long period of time.

OBJECTS AND SUMMARY OF THE INVENTION

The primary object of the invention is to provide a rotary drum type solid-liquid separation apparatus which is excellent in solid-liquid separation performance, facilitates withdrawal of the solid content arrested by the filter medium, and which can be operated continuously for a long period of time while preventing the filter medium from becoming clogged.

Another object of the invention is to provide a rotary drum type solid-liquid separation apparatus equipped with a filter medium which is less abraded or damaged, and the service life of which is prolonged, thus requiring fewer replacements with a new one.

Still another object of the invention is to provide a rotary drum type solid-liquid separation apparatus which can collect the arrested solid content efficiently without degrading the quality of filtered water, and the filter medium of which is rarely damaged.

When filter cloth having a raised fiber layer which is formed by napping the weft of the base material in one direction along the length of the material to create flexible and yielding naps of a diameter of 0.1 to 10 $\mu$m is used with a solid-liquid separation apparatus, the naps lie and form a very fine filter layer at the time of solid-liquid separation, to arrest fine solids contained in the solid-liquid mixture. On the other hand, when the arrested solids are to be collected, the naps are raised, facilitating washing-off of the solids from the filter cloth. The present invention is based on the understanding that the filter cloth having the above properties is suitably used with the rotary drum type solid-liquid separation apparatus. Furthermore, the invention is based on the studies which were made to find how to protect the fine naps of the filter layer so as for the filter cloth having the above-mentioned properties to be practically used with the rotary drum type solid-liquid separation apparatus.

According to the invention, a solid-liquid separation apparatus is provided which comprises a filtration drum comprising a rotary drum constituted by a plurality of annular stays arranged in parallel to one another and a plurality of reinforcing ribs arranged horizontally and connecting the annular stays together, and a filter cloth mounted around the rotary drum. A solid-liquid mixture is introduced into the filtration drum, and caused to pass through the filter cloth so that solids are separated from the solid-liquid mixture while the filtration drum is rotated.

The filter cloth used in the apparatus of the invention includes a base material having a surface facing the interior of the filtration drum. The surface of the base material is covered with a napped filter layer formed by a multiplicity of fibers having a diameter of 0.1 to 10 $\mu$m.

Preferably, the base material comprises a woven material having a weft extending along a rotational axis of the rotary drum, and a warp extending in the circumferential direction of the rotary drum. The fibers constituting the napped filter layer are formed by napping chiefly the weft in a direction in which the warp extends. The filter cloth has an elongation percentage of not smaller than 1.0%.

Still preferably, a first sprayer means is arranged outside the filtration drum in a facing relation to an outer peripheral surface of the filter cloth, for flushing a collecting liquid toward the filter cloth to collect solids arrested by the filter cloth, and collecting hopper means is arranged inside the filtration drum, for collecting solids washed off by the collecting liquid. A second sprayer means is arranged inside the filtration drum in a facing relation to an inner peripheral surface of the filter cloth, for flushing a washing liquid toward the filter cloth to wash off solids attached to the fibers of the napped filter layer.

Further, a third sprayer means is preferably arranged outside the filtration drum in a facing relation to the outer peripheral surface of the filter cloth, for spraying chemicals toward the filter cloth to wash the filter cloth.

Still preferably, a tightening means is wound around an outer periphery of the annular stay, for securely fixing the filter cloth to the annular stay, and belt-like press means extends along an outer periphery of the reinforcing rib, for pressing the filter cloth against the reinforcing rib and securing the same to the rib.

Baffle means is preferably arranged inside the filtration drum, for attenuating waves produced at the surface of the solid-liquid mixture.

The above and other objects, features, and advantages of the invention will become more apparent from the ensuing detailed description taken in conjunction with the accompanying drawings.

DETAILED DESCRIPTION OF THE INVENTION

Figure 1:
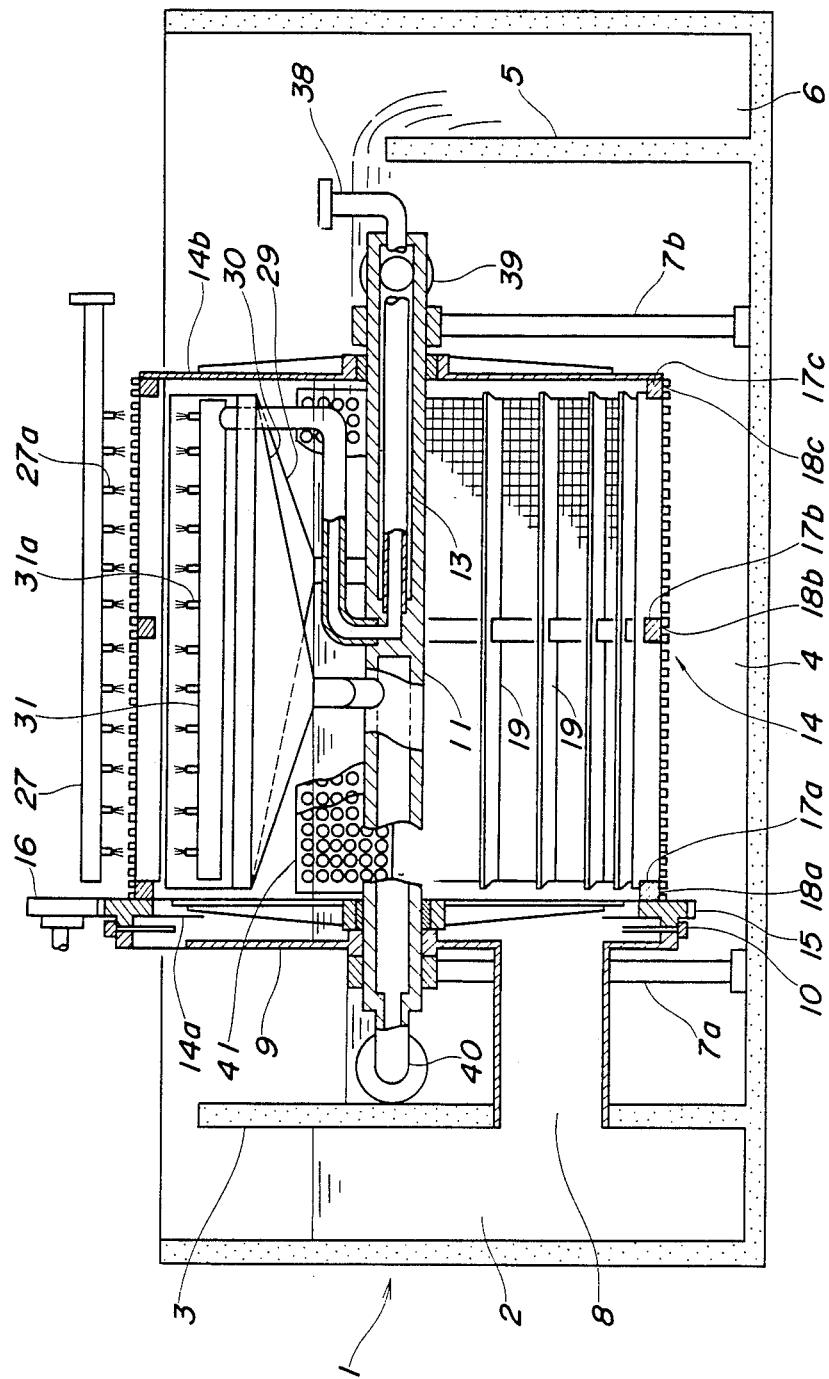
FIG. 1 is a longitudinal sectional view of a rotary drum type solid-liquid separation apparatus according to the invention.
Figure 2:
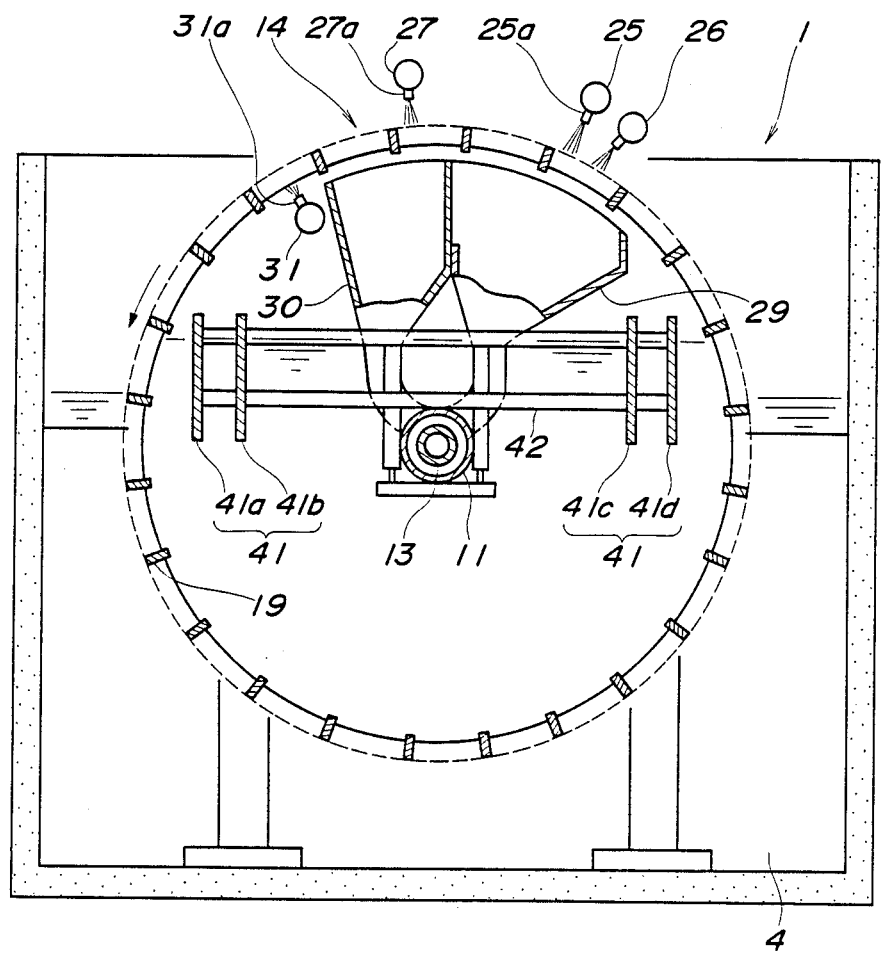
FIG. 2 is a cross-sectional view of the separation apparatus shown in FIG. 1.

In FIGS. 1 and 2, a treating tank 1 has its interior divided by a partition wall 3 and an overflow weir 5 into a solid-liquid mixture tank 2, a filtrate tank 4, and an overflow tank 6. Inside the filtrate tank 4 are arranged a hollow shaft 11 immovably supported by mount frames 7a and 7b, and a filtration drum 14 rotatably supported by the shaft 11 by means of bearings 12a and 12b. The filtration drum 14 has a gear 15 formed on an outer periphery of one end portion thereof. The gear 15 meshes with a gear 16 fixed to the drive shaft of a motor (not shown).

Figure 3:
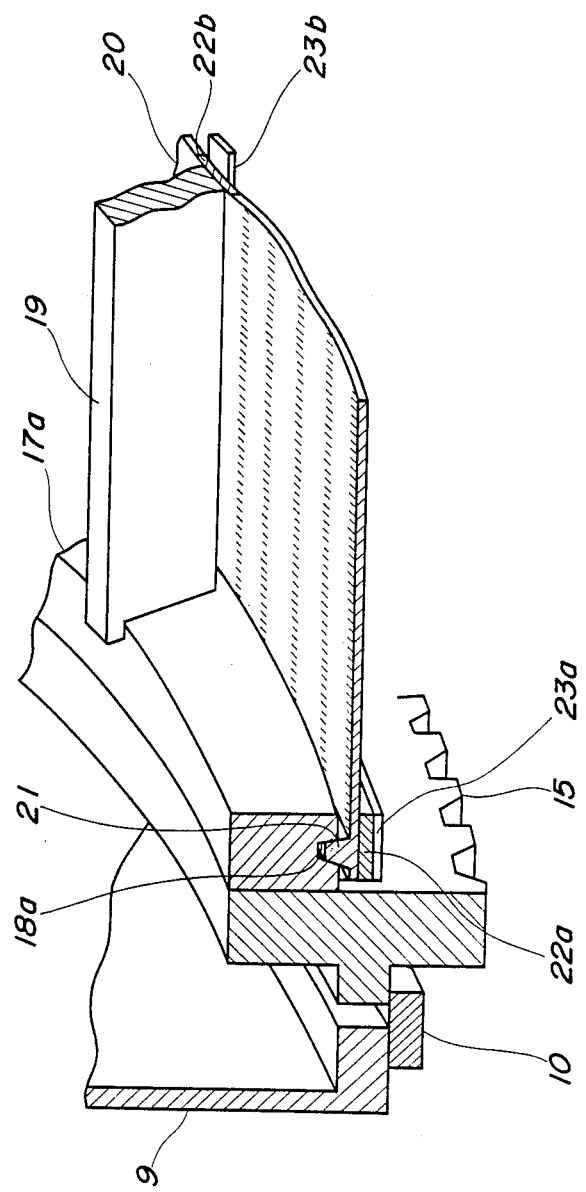
FIG. 3 is an enlarged perspective view illustrating how filter cloth is attached to an annular stay and a reinforcing rib.

A disc-shaped seal plate 9 is arranged in the filtrate tank 4 opposite to one end face 14a of the filtration drum 14, and is secured to the center shaft 11. As shown in FIGS. 1 and 3, a seal ring 10 is arranged to seal the junction of the seal plate 9 and the end face 14a of the filtration drum 14. Further, as shown in FIG. 1, a solid-liquid mixture inlet pipe 8 is arranged between the seal plate 9 and the partition wall 3, such that the mixture tank 2 and the interior of the drum 14 communicate with each other through the inlet pipe 8.

Thus, the filtration drum 14 has an open structure at its end 14a, i.e., on the side of the seal plate 9, for introducing a solid-liquid mixture thereinto. By contrast, the other end 14b of the drum 14 close to the overflow weir 5 is closed, thus forming an enclosed end structure.

The filtration drum 14 includes, as shown in FIG. 1, annular stays 17a, 17b and 17c arranged at the middle and opposite end portions of the drum 14 and extending parallel to one another, each of the stays having a groove 18a, 18b, 18c for fitting the filter cloth thereinto. A number of reinforcing ribs 19 are arranged horizontally to couple the annular stays together.

A filter cloth 20 is wound around the above-mentioned annular stays 17a, 17b and 17c and the reinforcing ribs 19, with protrusions 21 formed at its middle and side edge portions thereof fitted in the grooves 18a, 18b and 18c, respectively, as shown in FIGS. 1 and 3.

Figure 4:
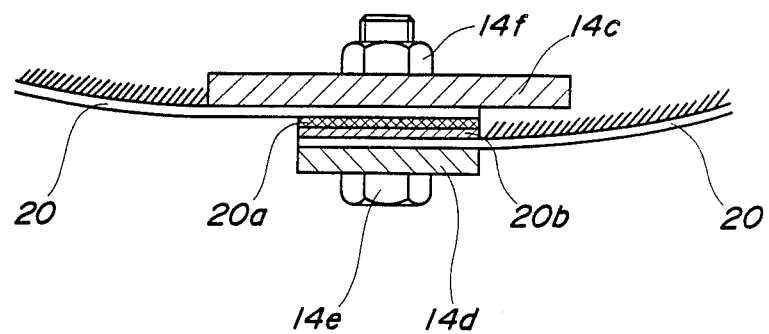
FIG. 4 is a partial sectional view showing how the ends of the filter cloth are bonded to each other.

As shown in FIG. 4, a blind plate 14c, arranged at a position on the circumference of the filtration drum 14, extends longitudinally between the opposite annular stays 17a and 17c and is secured thereto. Paired fastener elements 20a and 20b, for example, one composed of a numerous looped engaging element group and the other composed of a numerous mushroom-like engaging element group, are sewed to the obverse surface of one end edge of the filter cloth and to the reverse surface of the other end edge of the same. When the filter cloth 20 is wound around the filtration drum 14, the fastener elements 20a and 20b are overlapped on the outer surface of the blind plate 14c to temporarily fasten the filter cloth 20. Then, a press plate 14d is pressed against the blind plate 14c with the end edges of the filter cloth 20 interposed therebetween, and the plate 14d and the end edges of the cloth 20 are fixed to the drum 14 by means of bolts 14e and nuts 14f.

As shown in FIG. 3, a flexible flat belt 22a of urethane resin is heat-fused or bonded by an adhesive to each of those outer surface portions of the filter cloth 20 which surround the annular stays 17a, 17b and 17c. An annular metal band 23a is wound around each flat belt 22a, such that as the bands 23a are tightened, the filter cloth 20 is securely fastened to the annular stays 17a, 17b and 17c.

Figure 5:
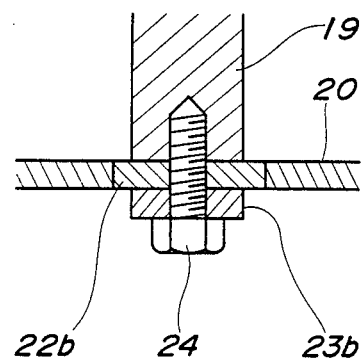
FIG. 5 is a partial sectional view showing how the filter cloth is secured to the reinforcing rib.

Further, as shown in the sectional view of FIG. 5, those portions of the filter cloth 20 which surround the reinforcing ribs 19 are impregnated with flexible urethane resin, to form band portions 22b. A press plate 23b of metal is placed on each of the band portions 22b and is secured, together with the filter cloth 20, to the corresponding reinforcing rib 19 by a plurality of screws 24.

The arrangement described so far uses a single piece of filter cloth 20. Alternatively, a number of smaller pieces of filter cloth may be used, in order to facilitate replacement of the filter cloth and save the cost incurred by the replacement of the filter cloth that is only partly damaged. In this case, each piece of the cloth may have such a shape as to be placed around the circumference or along the rotary shaft of the drum.

Figure 6:
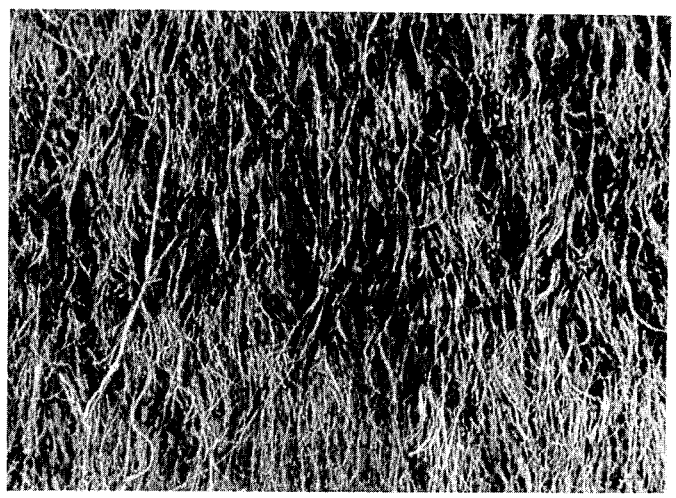
FIGS. 6 and 7 are micrographs obtained by using a scanning type electron microscope, and showing the shape of fibers on the surface of the filter cloth used in the separation apparatus of the invention.
Figure 7:
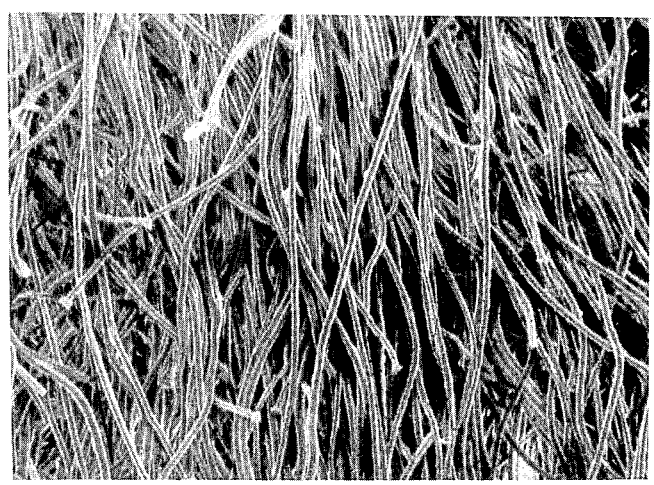
Figure 8:
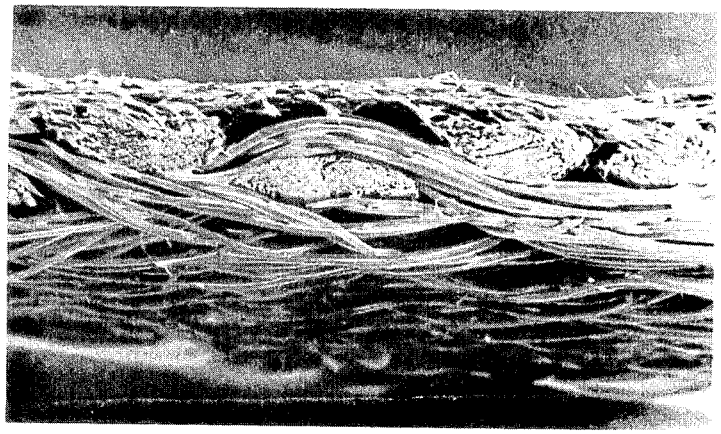
FIG. 8 is a micrograph obtained by using a scanning type electron microscope and showing the shape of fibers on the longitudinally cut surface of the filter cloth shown in FIGS. 6 and 7.
Figure 9:
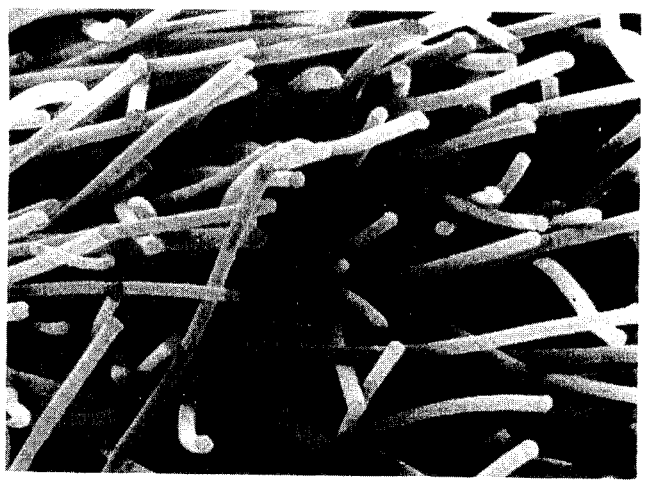
FIGS. 9 and 10 are micrographs obtained by using a scanning type electron microscope and showing, respectively, the shape of fibers on the filter surface and the longitudinally cut surface of conventional filter cloth.
Figure 10:
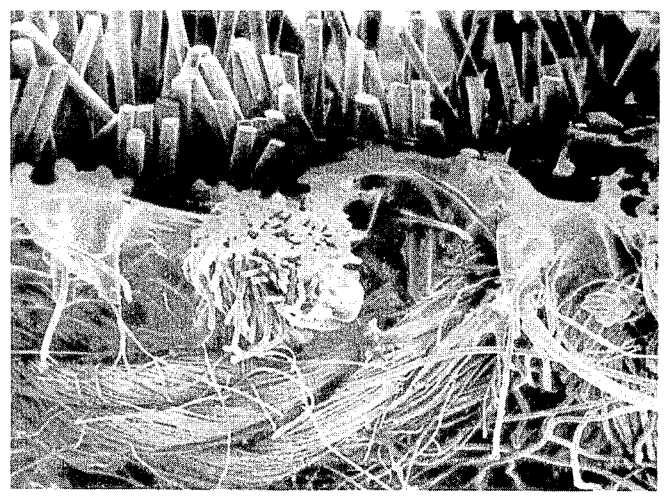

The filter cloth 20 comprises a base woven material, at least the weft of which is made of a polyester fiber, and a filter layer of raised fine fibers or naps which are formed by napping directly the surface of the woven material and which have a diameter of 0.1 to 10 $\mu$m, preferably 0.3 to 7 $\mu$m, and still preferably 0.3 to 5 $\mu$m, like the one disclosed in Japanese Patent Laid Open No. 58-207917 and No. 59-115720. FIGS. 6 and 7 are micrographs obtained by using a scanning type electron microscope and showing the surface of this filter cloth (30 and 300 magnifications respectively), and FIG. 8 is a micrograph showing the longitudinal cross section of the fiber cloth (60 magnifications). It is apparent from these micrographs that the density of the naps or raised fine fibers is very high and the naps lie on the surface of the woven material and form a filter layer which covers the surface of the material and has an almost flat surface.

FIGS. 9 to 12 are micrographs obtained by using a scanning type electron microscope and showing raised fiber layers of conventional filter cloth, which are given for comparison with the filter cloth used in the present invention. The micrographs of FIGS. 9 and 10 (30 magnifications) show, respectively, the filter surface and the longitudinal section of the conventional filter cloth, the raised fibers of which are formed by means of flocking using an adhesive. As is apparent from these micrographs, the interval between the raised fibers of the conventional flocked filter cloth, i.e., the space between the fibers, is considerably large and therefore will allow fine solids to easily pass therethrough, thus achieving a very low arresting rate. The interval between the raised fibers is necessarily large because the raised fibers of the conventional filter cloth are formed by flocking fibers by use of an adhesive. More specifically, the density of the flocked fibers cannot be increased so that the openings of the base woven material may not be filled with the adhesive. Furthermore, the diameter of the flocked fibers is as large as 30 to 100 $\mu$m, inevitably leaving a relatively large space between the flocked fibers. The flocked fibers of the conventional filter cloth, shown in FIGS. 9 and 10, have a diameter of as large as 30 to 100 $\mu$m and therefore are rigid and unyielding. Consequently, the spaces between the flocked fibers are relatively deep.

Figure 11:
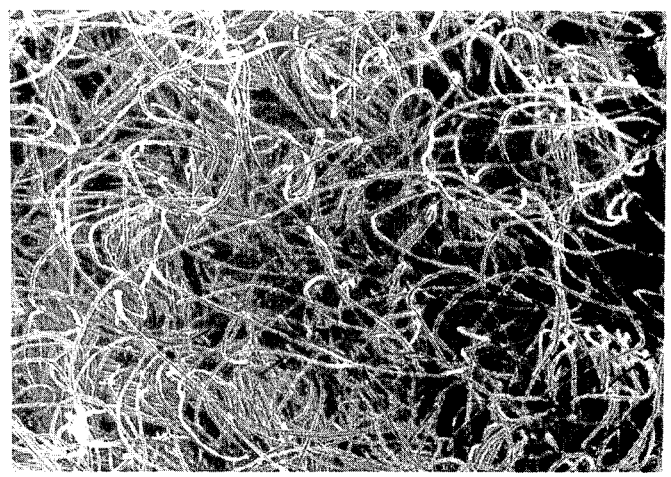
FIGS. 11 and 12 are micrographs obtained by using a scanning type electron microscope and showing, respectively, the shape of fibers on the filter surface and the longitudinally cut surface of other conventional filter cloth.
Figure 12:

FIGS. 11 and 12 are micrographs (30 magnifications) showing, respectively, the filter surface and the longitudinal section of the conventional filter cloth having raised fibers which are formed by napping the surface of the base woven material and which have a large diameter of several tens of microns. As can be seen from the micrographs, the space between the raised fibers is slightly smaller than that of the conventional filter cloth with flocked fibers, but is still large and deep. In addition, the density of the raised fibers is low so that the surface of the base woven material is visible, and the raised fibers are curled and therefore the filter layer is bulky.

The woven material employed in the present invention uses, as a weft, a very fine polyester two-ply or three-ply spun yarn or multi-filament having a diameter of 0.1 to 10 $\mu$m and an equivalent single number of 200 to 50000. Preferably, the woven material is a satin fabric with the weft skipping 3 to 8 stitches of the warp. The filter cloth is fabricated such that the weft extends in the width direction of the cloth (i.e., along the rotational axis of the filtration drum 14) at a density of 20 to 100 yarns/cm and the warp extends in the longitudinal direction of the cloth (i.e., in the circumferential direction of the drum 14). Chiefly the weft is napped to create naps directed in the longitudinal direction of the cloth (i.e., along the warp). The float stitch work is employed, as described above, in order to reduce the number of crossover of the weft with the warp and thereby to obtain filter cloth with a smooth surface. The weft is chiefly napped because a large tensile force acts upon the warp. If the warp is napped, the filter cloth will be lowered in strength.

On the other hand, the warp used in the filter cloth of the present invention preferably consists of a bundle of 10 to 150 synthetic fibers having a diameter of 10 to 30 $\mu$m, such as a polyester fiber, polyamide fiber, polyvinyl alcohol fiber, polypropylene fiber or polyacrylonitrile fiber. The warp density is 0.7 to 3 times the weft density. Preferably, the weft and warp are each twisted 4 to 15 times per centimeter, so as to retain the raised fibers or naps on the filter cloth for a long period of time.

According to the invention, a polyester fiber is used as the weft extending in the width direction of the filter cloth and chiefly the weft is raised to create naps, for the following reasons:

Fine polyester fiber can be easily raised to create naps and has high durability, and the naps created are straight from the base to tip. Therefore, fine polyester fiber is very suitable for forming a filter layer of the filter cloth. Polyamide fiber is also known as a fine fiber. The polyamide fiber, however, has a large elongation percentage and therefore cannot be napped with ease. Further, the naps created are not uniform in length and liable to be curled. If the naps are curled, they will become entangled with one another and form pills, and therefore the service life of the filter cloth will be shortened.

The diameter of the raised fibers or naps should be in a range of 0.1 to 10 $\mu$m. If the diameter of the naps is greater than 10 $\mu$m, the naps are too rigid to lie to form a satisfactory filter layer, and the interval between the naps is not sufficiently narrow. Therefore, fine solids will possibly pass through the interval, thus significantly degrading the solid arresting rate. Furthermore, the surface of the filter layer is uneven. Solids will therefore be caught in the recess of the uneven layer and sometimes rigid fibers will penetrate through the solids. Such solids will not come off the filter layer easily.

Figure 13:
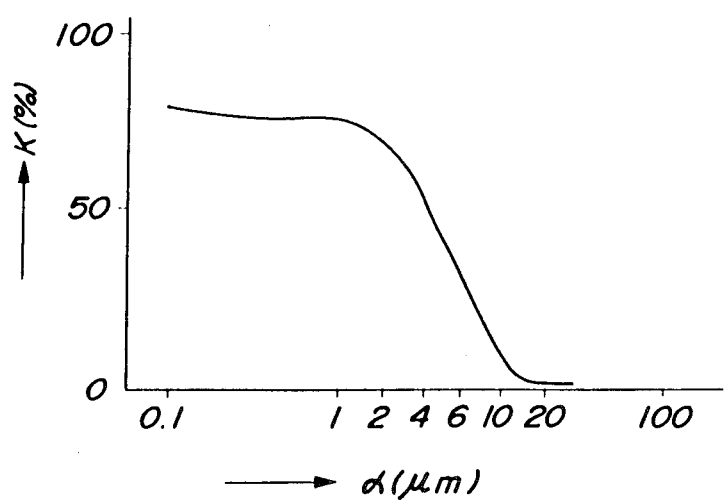
FIG. 13 is a graph showing the relationship between diameter d ($\mu$m) of raised fibers of the filter cloth and solid arresting rate K (%) of the same.

FIG. 13 shows the relationship between the diameter d (μm) of the naps or raised fibers and the solid arresting rate K (%), obtained by using lake water, as a solid-liquid mixture, containing 100 mg of microcystis (so-called "aoko" in Japanese) per liter. The solid arresting rate K is represented by a percentage by weight of the arrested solids with respect to the weight of the solids contained in the solid-liquid mixture, both the weights being measured after water was removed with application of heat. FIG. 13 indicates that the solid arresting rate lowers drastically when the diameter of the naps exceeds 10 μm, and that the filter cloth having naps of such a large diameter cannot effectively arrest fine solids such as algae. The upper limit of the diameter of the naps is preferably 7 μm, and still preferably 5 μm. If, on the other hand, the diameter of the naps is smaller than 0.1 μm, the naps are low in strength and will be cut easily, though the density of the naps can be increased. Further, the flow resistance of the filter layer increases. For these reasons, the filter cloth having naps of a diameter smaller than 0.1 μm is not practicable.

The naps constituted by fine fibers of a diameter of 0.1 to 10 μm have another advantage in that they have high flexibility, as evidenced by the fact that the flexibility of fibers is inversely proportional to the fourth power of the diameter of the naps. When solid-liquid separation is performed, the naps lie and form a filter layer having fine openings, so as to arrest fine solids on the surface of the layer, while preventing solids from entering the interval between the naps. Therefore, during the process of collecting the arrested solids, the solids attached on the naps can be easily washed off. Moreover, when the solids are collected, the naps are directed away from the filter cloth in the dropping direction of the collecting medium or washing water, whereby solids present in the interval between the fibers can be washed off easily.

If the length of the naps is too small, the filter cloth will not be sufficiently covered with the filter layer, which leads to a poor arresting rate. On the other hand, if the naps are too long, they will be entangled with one another and therefore the filtering ability will be lowered. Preferably, the naps each have a length enough to skip 2 to 6 stitches of the weft. The naps having such length can lie on the surface of the base material and form an excellent filter layer with 100 to 40000 naps present per millimeter.

Figure 14:
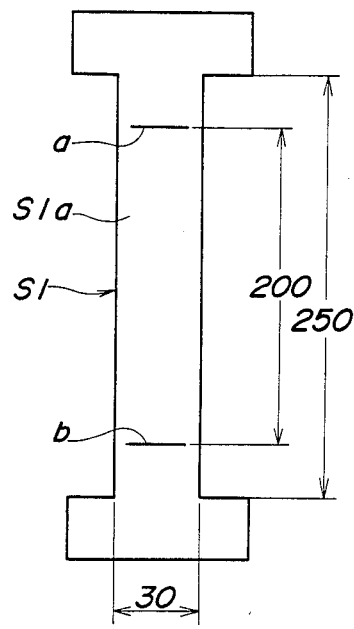
FIG. 14 is a plan view showing a test piece of the filter cloth subjected to an elongation test.

The filter cloth 14 desirably has an elongation percentage of not smaller than 1.0% in the direction of the warp, for the reason stated hereinafter. The elongation percentage of the filter cloth 14 was measured as follows:

An I-shaped test piece S1, shown in FIG. 14, was cut out from the filter cloth. An intermediate measurement portion S1a of the test piece S1 had a length of 250 mm and a width of 30 mm. The test piece S1 was held at opposite ends by a tensile strength tester and applied with an initial load of 100 gf. Lines a and b with a distance of 200 mm therebetween were marked on the opposite sides of the measurement portion S1a with respect to the center thereof. Then, a load of 12 kgf was applied to the test piece S1 for 90 minutes. After 90 minutes passed, distance X between the lines a and b was measured, and elongation percentage Ts was calculated by the following formula:

$$= [(X-200)/200] \times 100.$$

Measurement of elongation percentage is preferably carried out in a room where the temperature and humidity are controlled to 25° C. and 60%, respectively.

Figure 15:
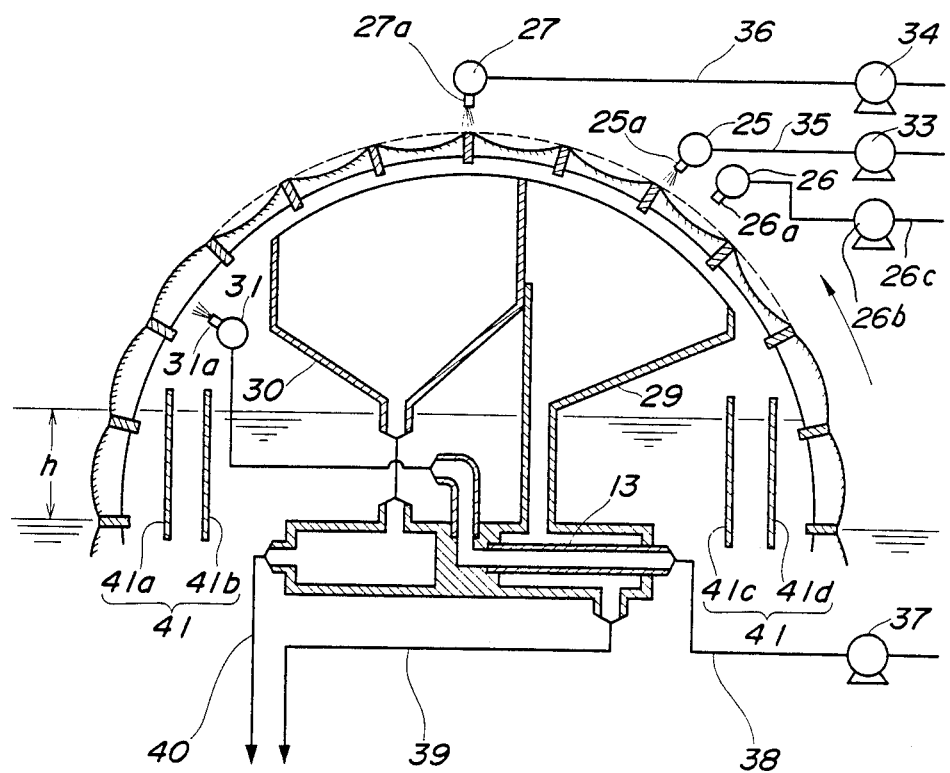
FIG. 15 is a diagram showing the piping of the separation apparatus of the invention, as well as the arrangement of a collecting sprayer, a wash sprayer and a chemical wash sprayer.

The filter cloth having the properties described above is stretched around the filtration drum 14, as shown in FIGS. 3 and 15, such that the filter layer faces the interior of the drum 14 and the naps lie in a direction opposite to the rotational direction (indicated by the arrow) of the drum 14.

Referring again to FIGS. 1 and 2, a solid collecting sprayer 25 is arranged outside the filtration drum 14 and includes a plurality of nozzles 25a situated along the axis of the drum at an upper right portion with respect to the axis of the drum, as viewed in FIG. 2, i.e., at a position spaced from the top of the filtration drum 14 on the upstream side relative to the direction of rotation of the drum. Similarly, another solid collecting sprayer 27 is arranged approximately above the center axis of the drum 14 and includes a plurality of nozzles 27a located along the axis of the drum. Inside the filtration drum 14 are arranged solid collecting hoppers 29 and 30 corresponding to the collecting sprayers 25 and 27. A chemical wash sprayer 26 is arranged outside the filtration drum 14 at a position upstream of the collecting sprayer 25 and adjacent thereto, and includes a plurality of nozzles 26a. A wash sprayer 31 which also includes a plurality of nozzles 31a is arranged inside the filtration drum 14 at a position downstream of the collecting sprayer 27.

The collecting sprayers 25 and 27 are, as shown in FIGS. 1 and 15, connected respectively to pipes 35 and 36 each having one end opening in the filtrate tank 5 at a location below the liquid level. Pumps 33 and 34 are disposed in the middle of the pipes 35 and 36, respectively. The chemical wash sprayer 26 is connected to one end of a pipe 26c having another end connected, through a pump 26b, to a chemical tank (not shown). The wash sprayer 31 is connected, via a pipe 13 arranged within the center shaft 11, to one end of a pipe 38 the other end of which opens in the filtrate tank 4 at a position below the liquid level. A pump 37 is disposed in the middle of the pipe 38. The solid collecting hoppers 29 and 30 are fixed to the center shaft 11 and are connected through the center shaft 11 to pipes 39 and 40, respectively.

As shown in FIGS. 1 and 2, four baffle plates 41 are arranged inside the filtration drum 14 in the proximity of the locus of the reinforcing ribs 19 formed as the drum 14 rotates, at a position corresponding to the liquid level during operation of the apparatus, and extend along the rotational axis of the drum 14. The baffle plates 41 include two pairs 41a, 41b; 41c, 41d which are, as shown in FIG. 2, arranged on the downstream and upstream sides, respectively, relative to the rotational direction of the drum 14, and are fixed to and supported by the center shaft 11 by means of a mount frame 42. The baffle plates 41a, 41b, 41c and 41d are each made of a punching metal plate having a multiplicity of holes of 10 to 50 mm in diameter and an open area rate of 20 to 80%. Each of the baffle plates 41a, 41b, 41c and 41d has a width extending along the depth of the liquid between the level lower than the height of the overflow weir 5 and the level higher than the maximum liquid level during operation of the apparatus. The length of the baffles is substantially equal to that of the reinforcing ribs 19.

The baffle plates may be supported so as to be movable vertically corresponding to changes in the liquid level, or may be floated on the liquid.

The operation of the solid-liquid separation apparatus described above will be explained. In FIG. 1, the solid-liquid mixture supplied to the mixture tank 2 of the treating tank 1 is introduced into the filtration drum 14 through the mixture inlet pipe 8 and the open end 14a of the drum 14. The solid-liquid mixture remains in the drum 14 because of the seal plate 9 and the closed end 14b of the drum 14.

The filtration drum 14 is being rotated by the motor (not shown) coupled to the drum 14 by the gears 16 and 15, in the direction of the arrow (FIG. 2) at a constant speed. The solid-liquid mixture introduced into the drum 14 passes through the filter cloth 20 due to the differential h (FIG. 15) between the level of the liquid inside the filtration drum 14 and the level of the liquid inside the filtrate tank 4 which is determined by the heights of the partition wall 3 and the overflow weir 5. Only the liquid is allowed to flow through the drum 14 to the filtrate tank 4, and the filtrate in the tank 4 flows over the overflow weir 5 to the tank 6 and then is discharged to the outside of the apparatus. The solids contained in the solid-liquid mixture are arrested by the filter cloth 20. Although the liquid surface is disturbed as the reinforcing ribs 19 plunge into and emerge from the liquid due to the rotation of the drum 14, it is prevented from becoming turbulent by the baffle plates 41a, 41b, 41c and 41d (FIG. 2). It is therefore rarely probable that the solids once caught by the filter cloth 20 are washed off. Although, during operation, the filtration drum 14 receives a large force corresponding to the level differential h, it is prevented from being deformed by the reinforcing ribs 19. Also, the filter cloth 20 can withstand a large force applied thereto, since, as shown in FIG. 3, the filter cloth 20 is securely fixed to the drum by the metal bands 23a with the protrusions 21 fitted in the grooves 18a, 18b and 18c and is also securely fixed to the reinforcing ribs 19 by the screws 24 screwed into the ribs 19 with the cloth 20 and the press plate 23b interposed therebetween.

In the above embodiment, in order to securely fix the filter cloth to the filtration drum, the flat belt of urethane resin is interposed between the filter cloth and each annular stay, and the filter cloth is impregnated with urethane resin to form a band. Alternatively, a soft resin such as silicone resin may be used instead of urethane resin. In securely fixing the filter cloth to the drum, a suitable member made of silicone resin may be interposed between the two. Furthermore, the annular stays, the annular bands wound around the stays, the reinforcing ribs, the press plate for pressing the filter cloth, etc. may be lined with rubber. In any case, the point is that the filter cloth must be secured to the annular stays or to the reinforcing ribs with a flexible member interposed therebetween, that is, the former must not directly contact the latter. The filter cloth need not be secured to all of the reinforcing ribs. In this case, those reinforcing ribs to which the filter cloth is not secured may be spaced sufficiently from the cloth so that they do not contact the filter cloth even when the cloth is elongated.

Figure 16:
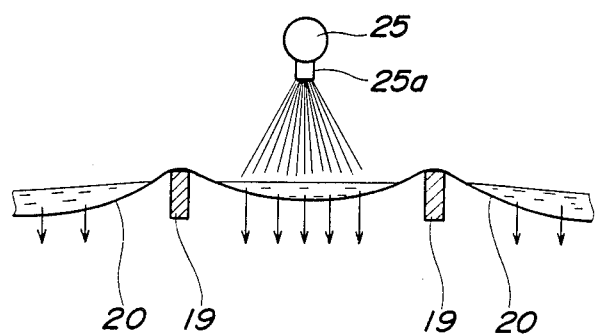
FIG. 16 is a partial sectional view schematically showing how solids are collected by means of the collecting sprayer.

Referring to FIGS. 2 and 15, as the filtration drum 14 rotates, the solids contained in the solid-liquid mixture and caught on the inner surface of the filter cloth 20 (FIG. 3) reach a position near the collecting sprayer 25 where they are washed off by the filtrate water (hereinafter called "the collecting water") flushed through the nozzles 25a. The collecting water is supplied from the filtrate tank 4 through the pipe 35 in the middle of which the pump 33 is disposed. Since the filter cloth 20, which is stretched in tension around the annular stays 17a, 17b and 17c and the reinforcing ribs 19, has an elongation percentage of not smaller than 1.0% in the direction of the warp, it bulges in the direction of application of the force thereto, as shown in FIG. 16. As a result, the collecting water is stored in the bulged portion of the filter cloth 20, as shown in FIG. 16. In this case, the collecting water flushed from the nozzles 25a does not directly strike against the filter cloth 20 but applies a force to the stored water, thereby promoting the passing of the collecting water through the filter cloth.

If filter cloth having a small elongation percentage is used, it will not bulge and almost no collecting water will be stored on the filter cloth. The collecting water flushed from the nozzles will therefore directly collide against the filter cloth, thus causing the cloth to vibrate. If the injection pressure of the collecting water is increased to promote the passing of the collecting water through the filter cloth, the filter cloth will be even more violently vibrated and the service life thereof will be remarkably shortened. Generally, the service life of filter cloth is inversely proportional to the exponential function of the injection pressure (the function of the third power of the injection pressure) in the case of flushing the collecting water directly to the filter cloth. On the other hand, the capability of collecting solids by the collecting water is proportional to the amount of the collecting water passed through the filter cloth. The amount of the water passing through the filter cloth when a force is applied to the collecting water stored in the bulged portion of the filter cloth 20, as stated above, is about 2.5 times as much as that passing through the filter cloth when the collecting water is directly flushed to the filter cloth with the same injection pressure. For this reason, with the solid-liquid separation apparatus of the present invention, the necessary efficiency of collecting solids is achieved by flushing the collecting water with a low injection pressure of approximately 5 kgf/cm$^2$G. In the case of flushing the collecting water directly to the filter cloth, an injection pressure of about 12 kgf/cm$^2$G is required to achieve the same solid collecting efficiency. Therefore, the service life of the filter cloth used in the separation apparatus of the invention is more than 15 times as long as that of the filter cloth to which the collecting water is directly flushed.

The collecting water that has passed through the filter cloth 20 serves to raise or direct the napped fibers of the cloth 20 downward, which facilitates the washing-off of the solids arrested by the napped layer. Thus, when the solid-liquid mixture is filtered, the napped fibers of the filter cloth 20 lie in the direction of the warp, thus forming a filter layer with small openings. On the other hand, when the solids are collected, the napped fibers are directed in the dropping direction of the collecting water, whereby space is formed between the raised fibers and allows the solids to drop. Therefore, the filter cloth used in the apparatus of the invention is excellent in both the solid arresting and collecting efficiencies.

The solids washed off by the collecting water flushed from the nozzles 25a are discharged to the outside of the apparatus through the collecting hopper 29, the center shaft 11 and the pipe 39. The filter cloth, on which solids may still remain after the above-described wash process, is subjected to an additional wash process at a position near the collecting sprayer 27 as the filtration drum 14 further rotates. In the same manner as described above, the solids are washed off by the filtrate (collecting water) flushed from the nozzles 27a connected to the filtrate tank 4 through the pipe 36 in the middle of which the pump 34 is disposed. The solids collected at this time are also discharged to the outside of the apparatus through the collecting hopper 39, the center shaft 11 and the pipe 40.

The napped filter layer of the filter cloth 20 from which solids have been removed then moves to a position near the wash sprayer 31, where it is washed by the filtered water flushed thereto from the nozzles 31a connected to the filtrate tank 4 via the pipe 13 within the center shaft 11, and the pipe 38 connected to the pipe 13 and provided with the pump 37. Then the napped filter layer is subjected again to solid-liquid separation. The processes described above are repeated to carry out separation of solids from the solid-liquid mixture.

In the above embodiment, either the collecting sprayers or the wash sprayer may be omitted. This is because the collecting sprayer itself has a function of washing the filter cloth, whereas the collecting of solids can be effected also by the wash sprayer. Moreover, although the embodiment uses two collecting sprayers each of which includes nozzles disposed in line, more sprayers may be arranged along the rotational direction of the filtration drum.

Furthermore, in the arrangement described above, the nozzles 25a and 27a of the collecting sprayers are respectively arranged in line. Alternatively, they may be disposed in a zigzag or staggered fashion, respectively. If the nozzles are arranged in this way, the filter cloth can be washed as if it were rubbed by the hand. Therefore, even if water is flushed with a low pressure of 5 kgf/cm²G, for example, a higher solid collecting efficiency is achieved than the case in which the water is flushed with a pressure of about 10 kgf/cm²G from the nozzles disposed in line. Further, the load applied on the filter cloth is low, and therefore the service life of the filter cloth is in no way shortened. The pressure of injection of water from the nozzles of the wash sprayer need not be high; the filter cloth can be washed sufficiently by water flushed thereto with a low pressure of about 1 kgf/cm²G. Thus, it is improbable that the fine fibers of the napped filter layer are damaged by the water pressure. The wash sprayer may be operated as desired, continuously or once a day.

The injection pressure of the water from the collecting sprayer may be changed within a range of 3 to 10 kgf/cm²G, and the injection pressure of the water from the wash sprayer may be changed within a range of 0.3 to 2 kgf/cm²G, depending upon the properties of solids to be arrested by the filter cloth. Furthermore, solids may be collected in a single stage instead of two stages as employed in the foregoing embodiment.

Although the embodiment uses two collecting hoppers, a single hopper may be used in common. By using separate hoppers as in the embodiment, however, the concentration of the solids washed off can be increased, and the flow rate of water flushed from the collecting sprayer can be reduced.

The solid-liquid separation performance of the apparatus may be degraded after long use, due to bacteria etc. attached to the filter cloth 20. In such case, in order to remove the bacteria etc., chemicals such as acids or alkalis may be sprayed onto the filter cloth 20 through the nozzles 26a of the chemical sprayer 26 connected to the pipe 26c in the middle of which the pump 26b is disposed, at regular intervals, for example, once a month. The filtration drum 14 is preferably rotated slowly (e.g., one revolution per 1 to 60 minutes). Due to the capillary action, the chemicals spread over the napped fiber layer, whereby the effects of the chemicals last for a long period of time. Alkaline chemicals are advantageous in that they react upon the cells of bacteria etc. and dissolve the same, thus exhibiting an excellent bactericidal action. As the alkaline chemicals, hypochlorous soda (sodium hypochlorite), caustic soda (sodium hydroxide), or caustic potash (potassium hydroxide) may be used. As the acid chemicals, a hydrochloric acid or a sulfuric acid can be used, and a hydrogen peroxide can be used as the neutral chemicals, for example. The concentration of the chemicals is desirably adjusted such that the available chlorine which effects bactericidal action is 1 to 15% by weight in the case of using hypochlorous soda. The concentration of 1 to 15% by weight is applicable also to the other alkaline chemicals, the acid chemicals and the neutral chemicals.

The solid-liquid separation apparatus of the invention can be used in various industrial fields. For example, it can be used for separating solids from lake or river water. Other uses are for filtration or condensation of sludge, scum, flocks, washing water waste, etc. generated in waste water treatment, including suspended solids such as excess waste sludge, a by-product from the activated sludge reactor, and fixed slime coming out of the biological oxidation reactor. Further, the apparatus can be used for solid-liquid separation involved in paper making, pulp making, food processing, alcoholic drinks production, fermentation of "miso", and for reclamation of useful substances in chemical processing.

What is claimed is:

1. A solid-liquid separation apparatus comprising a filtration drum rotatably supported in a treating tank, and means for introducing a solid-liquid mixture into said filtration drum, wherein said filtration drum includes: a rotary drum constituted by a plurality of annular stays arranged in parallel to one another and a plurality of reinforcing ribs arranged horizontally and connecting said annular stays together, and a filter cloth mounted around said rotary drum, whereby the solid-liquid mixture is introduced into said filtration drum and caused to pass through said filter cloth so that solids are separated from the solid-liquid mixture while said filtration drum is rotated, said filter cloth including a base material having a surface facing the interior of said filtration drum, wherein said surface of said base material is covered with a napped filter layer formed by a multiplicity of fibers having a diameter of 0.1 to 10 μm.

2. The apparatus according to claim 1, wherein said base material comprises a woven material having a weft extending along a rotational axis of said rotary drum, and a warp extending in the circumferential direction of said rotary drum, and said fibers constituting said napped filter layer are formed by napping chiefly said weft in a direction in which said warp extends.

3. The apparatus according to claim 2, wherein at least said weft of the woven material comprises polyester fibers.

4. The apparatus according to claim 1, wherein said filter cloth has an elongation percentage Ts of not smaller than 1.0% which is defined by the following formula:

$$Ts = [(X-200)/200] \times 100,$$

where X represents the distance between two points on a test piece of the filter cloth measured after a load of 12 kgf is applied to said test piece for 90 minutes, said test piece is cut out from said filter cloth and has a measurement portion which is 250 mm long and 30 mm wide, and said two points are arbitrarily marked on said measurement portion beforehand with an initial load of 100 gf applied on said test piece and with a distance of 200 mm therebetween.

5. The apparatus according to claim 1, further comprising collecting sprayer means arranged outside said filtration drum in a facing relation to an outer peripheral surface of said filter cloth, for flushing a collecting liquid toward said filter cloth to collect solids arrested by said filter cloth, and collecting hopper means arranged inside said filtration drum, for collecting solids washed off by the collecting liquid.

6. The apparatus according to claim 5, wherein said collecting sprayer means is spaced from a top of said filtration drum on the upstream side with respect to the rotational direction of said filtration drum.

7. The apparatus according to claim 1, further comprising wash sprayer means arranged inside said filtration drum in a facing relation to an inner peripheral surface of said filter cloth, for flushing a washing liquid toward said filter cloth to wash off solids attached to said fibers of said napped filter layer.

8. The apparatus according to claim 7, wherein said wash sprayer means is spaced from a top of said filtration drum on the downstream side with respect to the rotational direction of said filtration drum.

9. The apparatus according to claim 1, further comprising chemical wash sprayer means arranged outside said filtration drum in a facing relation to an outer peripheral surface of said filter cloth, for spraying chemicals toward said filter cloth to wash said filter cloth.

10. The apparatus according to claim 1, further comprising tightening means wound around an outer periphery of said annular stays, for securely fixing said filter cloth to said annular stays, and belt-like press means extending along an outer periphery of the reinforcing ribs, for pressing said filter cloth against said reinforcing ribs and securing the same to said reinforcing ribs.

11. The apparatus according to claim 10, wherein a first flexible member is interposed between said tightening means and said filter cloth, and a second flexible member is interposed between said press means and said reinforcing ribs.

12. The apparatus according to claim 1, further comprising baffle means arranged inside said filtration drum, for attenuating waves produced at the surface of the solid-liquid mixture.

13. The apparatus according to claim 12, wherein said baffle means comprises a plate member extending along a rotational axis of said filtration drum and having an upper edge projecting above the surface of the solid-liquid mixture in said filtration drum and a lower edge immersed in the mixture in said filtration drum.

* * * * *